United States Patent
Brown et al.

(10) Patent No.: US 6,826,245 B1
(45) Date of Patent: Nov. 30, 2004

(54) OPTIMAL LOCATION OF A DIGITAL SYNC PATTERN

(75) Inventors: Christopher T. Brown, Sunnyvale, CA (US); Phares Grey, Milpitas, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/570,372

(22) Filed: May 12, 2000

(51) Int. Cl.[7] .................................... H04L 7/00
(52) U.S. Cl. ........................................ 375/368
(58) Field of Search ............................... 375/368, 354, 375/357, 342; 714/775; 370/514, 503

(56) References Cited

U.S. PATENT DOCUMENTS

| | | | | |
|---|---|---|---|---|
| 5,757,869 A | * | 5/1998 | Sands et al. | 375/366 |
| 6,154,468 A | * | 11/2000 | Lin et al. | 370/510 |
| 6,414,920 B1 | * | 7/2002 | Lee | 369/47.31 |
| 6,536,011 B1 | * | 3/2003 | Jang et al. | 714/814 |

* cited by examiner

Primary Examiner—Stephen Chin
Assistant Examiner—Kevin Kim
(74) Attorney, Agent, or Firm—Parsons Hsue & de Runtz LLP (57) ABSTRACT

Method and system for optimally estimating the location of each of a sequence of two or more synchronization patterns in a digital signal bit stream. A first reference location for a sync pattern is determined. A Boolean product or other product of the sync pattern (of length S) with S consecutive bit values of the digital stream is formed, for each of a selected consecutive sequence of candidates for a second reference location of the sync pattern within a window of selected length. A candidate reference location that yields the largest (or smallest) product value within the window is estimated to be a second or "next" reference location of the sync pattern, if the product value is at least equal to (or, alternatively, is no greater than) a selected threshold value. The sync pattern used for testing the digital stream can be varied from one location to another. The number of bit matches or the number of bit non-matches can be used to determine an optimal reference location for the sync pattern.

32 Claims, 10 Drawing Sheets

DVD SYNC TYPES

| Sync type | Pattern |
|---|---|
| SYNC0:0 | 0001_0010_0100_0100_0000_0000_0001_0001 |
| SYNC0:1 | 0001_0010_0000_0100_0000_0000_0001_0001 |
| SYNC0:2 | 1001_0010_0000_0100_0000_0000_0001_0001 |
| SYNC0:3 | 1001_0010_0100_0100_0000_0000_0001_0001 |
| SYNC1:0 | 0000_0100_0000_0100_0000_0000_0001_0001 |
| SYNC1:1 | 0000_0100_0000_0100_0000_0000_0001_0001 |
| SYNC1:2 | 1000_0100_0100_0100_0000_0000_0001_0001 |
| SYNC1:3 | 1000_0100_0000_0100_0000_0000_0001_0001 |
| SYNC2:0 | 0001_0000_0000_0100_0000_0000_0001_0001 |
| SYNC2:1 | 0001_0000_0100_0100_0000_0000_0001_0001 |
| SYNC2:2 | 1001_0000_0100_0100_0000_0000_0001_0001 |
| SYNC2:3 | 1001_0000_0000_0100_0000_0000_0001_0001 |
| SYNC3:0 | 0000_1000_0000_0100_0000_0000_0001_0001 |
| SYNC3:1 | 0000_1000_0100_0100_0000_0000_0001_0001 |
| SYNC3:2 | 1000_0010_0100_0100_0000_0000_0001_0001 |
| SYNC3:3 | 1000_0010_0000_0100_0000_0000_0001_0001 |

*Fig. 3A*

DVD SYNC TYPES

| Sync type | Pattern |
|---|---|
| SYNC4:0 | 0010_0000_0000_0100_0000_0000_0001_0001 |
| SYNC4:1 | 0001_0000_0100_0100_0000_0000_0001_0001 |
| SYNC4:2 | 1000_1000_0100_0100_0000_0000_0001_0001 |
| SYNC4:3 | 1000_1000_0000_0100_0000_0000_0001_0001 |
| SYNC5:0 | 0010_0010_0100_0100_0000_0000_0001_0001 |
| SYNC5:1 | 0010_0010_0000_0100_0000_0000_0001_0001 |
| SYNC5:2 | 1000_1001_0000_0100_0000_0000_0001_0001 |
| SYNC5:3 | 1000_0001_0000_0100_0000_0000_0001_0001 |
| SYNC6:0 | 0010_0100_1000_0100_0000_0000_0001_0001 |
| SYNC6:1 | 0010_0000_1000_0100_0000_0000_0001_0001 |
| SYNC6:2 | 1001_0000_1000_0100_0000_0000_0001_0001 |
| SYNC6:3 | 1000_0000_0100_0100_0000_0000_0001_0001 |
| SYNC7:0 | 0010_0100_0100_0100_0000_0000_0001_0001 |
| SYNC7:1 | 0010_0100_0000_0100_0000_0000_0001_0001 |
| SYNC7:2 | 1000_1000_1000_0100_0000_0000_0001_0001 |
| SYNC7:3 | 1000_0000_1000_0100_0000_0000_0001_0001 |

*Fig. 3B*

| SYNC TYPE | PATTERN 91 16-bit |
|---|---|
| CD SYNC | 1000_0000_0001_0000_0000_0010 |

*Fig. 3D*

| ROW | SYNC TYPE 32 bits | DATA 91 16-bit data symbols | SYNC TYPE 32 bits | DATA 91 16-bit data symbols |
|---|---|---|---|---|
| 0 | SYNC0 | DATA | SYNC5 | DATA |
| 1 | SYNC1 | DATA | SYNC5 | DATA |
| 2 | SYNC2 | DATA | SYNC5 | DATA |
| 3 | SYNC3 | DATA | SYNC5 | DATA |
| 4 | SYNC4 | DATA | SYNC5 | DATA |
| 5 | SYNC1 | DATA | SYNC6 | DATA |
| 6 | SYNC2 | DATA | SYNC6 | DATA |
| 7 | SYNC3 | DATA | SYNC6 | DATA |
| 8 | SYNC4 | DATA | SYNC6 | DATA |
| 9 | SYNC1 | DATA | SYNC7 | DATA |
| 10 | SYNC2 | DATA | SYNC7 | DATA |
| 11 | SYNC3 | DATA | SYNC7 | DATA |
| 12 | SYNC4 | DATA | SYNC7 | DATA |

Fig. 5

OPTIMAL LOCATION OF A DIGITAL SYNC PATTERN

FIELD OF THE INVENTION

This invention relates to determining an optimal location for each of a sequence of digital signal sync patterns.

BACKGROUND OF THE INVENTION

A digital data stream from an optical storage or other storage device or in general communications, contains a unique binary pattern, called a "sync pattern," that appears at predetermined time intervals within the digital bit stream. An ability to detect the sync pattern within the serial bit stream is required in order to recover the original data encoded in the communication. One problem encountered here is the presence of dirt or other foreign material (fingerprints, organic or inorganic substances, etc.) and scratches on the medium or defects that are stamped or otherwise embedded in the media during manufacturing, which can alter the data that are read. Another problem is signal degradation, due to noise or other interference with signal transmission and/or processing. Presence of such interfering alterations can damage the sync pattern and/or can cause the sync pattern to appear earlier or later than expected in the bit stream. If the sync pattern cannot be detected, data synchronization may be temporarily lost, resulting in elevated data error rates before the data are demodulated and corrected.

In a typical implementation, a sync window is used to search for the sync pattern. Once a valid sync pattern is found, normally requiring a perfect match with a reference pattern, the sync detect logic will not begin looking for the next sync pattern until the start of the next sync window, which is assumed to be located at an "ideal distance" B bits beyond the immediately preceding sync pattern. This approach prevents the sync detect logic from triggering on a false sync pattern that may appear within the data stream due to the presence of corrupted data within the bit stream. A sync window is typically 2N+1 bits wide, where N is a positive integer, spaced apart at an ideal or reference distance from the last sync pattern found. If the true sync pattern appears N or fewer bits too soon or N or fewer bits too late, relative to the identified and immediately preceding sync pattern, the sync pattern can still be detected, and a segment of original data following the present sync pattern can be demodulated correctly.

If data from the storage media are very corrupted, or if the transmission channel is not well designed, the sync pattern may be shifted more than a selected number of bits away from the ideal distance B, the sync pattern will fall outside the sync window, and the present sync pattern will be missed. If the sync window width H, typically 2N+1 bits, is increased to decrease the probability of not recognizing and capturing the present sync pattern (a type 1 error), the probability of sensing a false sync pattern (a type 2 error) is increased. It is also possible that a (modified) sync pattern appears within the window, but this sync pattern has one or more bit errors that prevent the sync comparison logic from detecting the presence of this sync pattern.

A typical sync pattern system used today assumes that the first sync pattern found within the sync window is the correct (and only) sync pattern and does not continue the search for any other sync patterns within the present sync window. This strategy may be counter-productive as the window width, H bits, is increased, and the probability of a type 2 error increases.

What is needed is a system that allows an arbitrarily wide sync window to be used and that identifies the "best" location for the next sync pattern, based on one or more metrics or other criteria for a "best fit." Preferably, this system should decrease the probability of occurrence of a type 1 error and/or of a type 2 error. Preferably, the system should be flexible enough to allow arbitrary changes to be implemented for the sync window parameters (H, B, S, etc.) and to allow changes in the parameters used for the best fit criterion or criteria.

SUMMARY OF THE INVENTION

These needs are met by the invention, which provides a system that examines each of H candidates (H=2N+1 or another positive integer) for a reference location of a signal stream sync pattern, identifies one or more candidate locations that provide a best fit, and compares the metric for a best fit location with a threshold metric value. The reference location for a sync pattern window may be the beginning, center or end of the window or any other suitable location within or measured relative to the window. The metric may be based on the number of bit pattern mismatches or on the number of bit pattern matches. If the metric value for a candidate best fit location is not at least as favorable as the threshold metric value, the candidate best fit location does not qualify, and the system uses another approach to estimate a best fit for a reference location for the next sync pattern. The sync window width, H bits, the ideal distance, B bits, and/or the width of the sync pattern, S bits, may be selected and fixed, or one or more of these parameters may be varied dynamically in response to certain error rates sensed by the system. The digital signal stream may be a general communication or may arise from a special purpose, such as data from a storage medium.

A Sync Control machine begins in an Idle State. When read channel data enters the system, Sync Control enters a Sync Sequence Validation state, which verifies that the two sync patterns have the expected spacing. For a bit stream with a DVD media source, the Sync Sequence Validation state is also used to determine if the two sync patterns are in an expected numerical order. When sync validation is completed, Sync Control moves to the next process. When DVD media signals are present, the next process is an ECC Block Validation process, which determines the beginning of an ECC block; this process is skipped for CD media signals (which includes CDROM, CDRead, CDRead/Write and CDAudio herein). In the next Sync Control process, Data Acquisition, a sync detect engine attempts to identify consecutive sync patterns and to transfer this information, together with the actual bit stream, to a demodulator.

DESCRIPTION OF BEST MODES OF THE INVENTION

Figure 1:
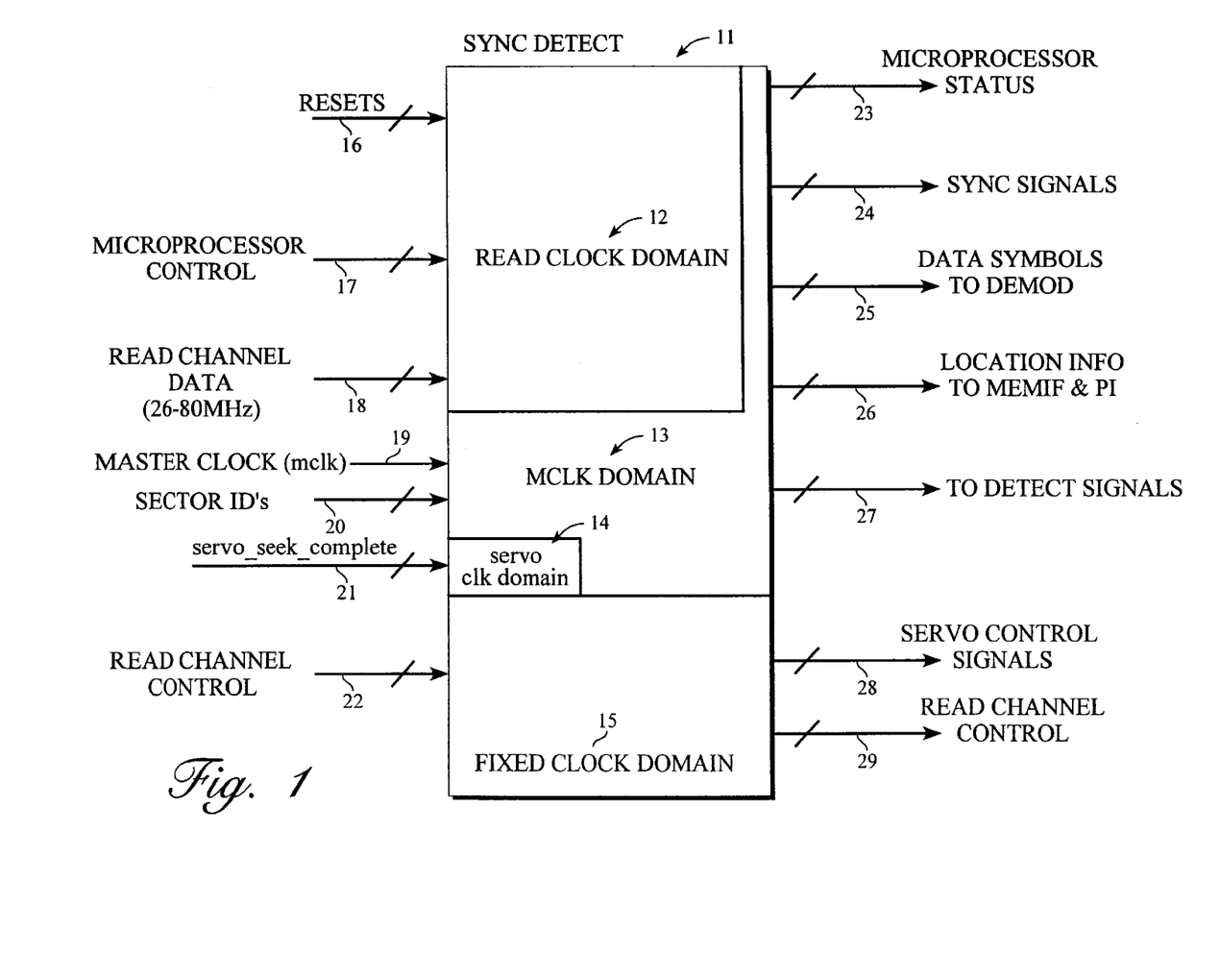
FIG. 1 illustrates schematically a sync detect block according to one embodiment of the invention.
Figure 2A:
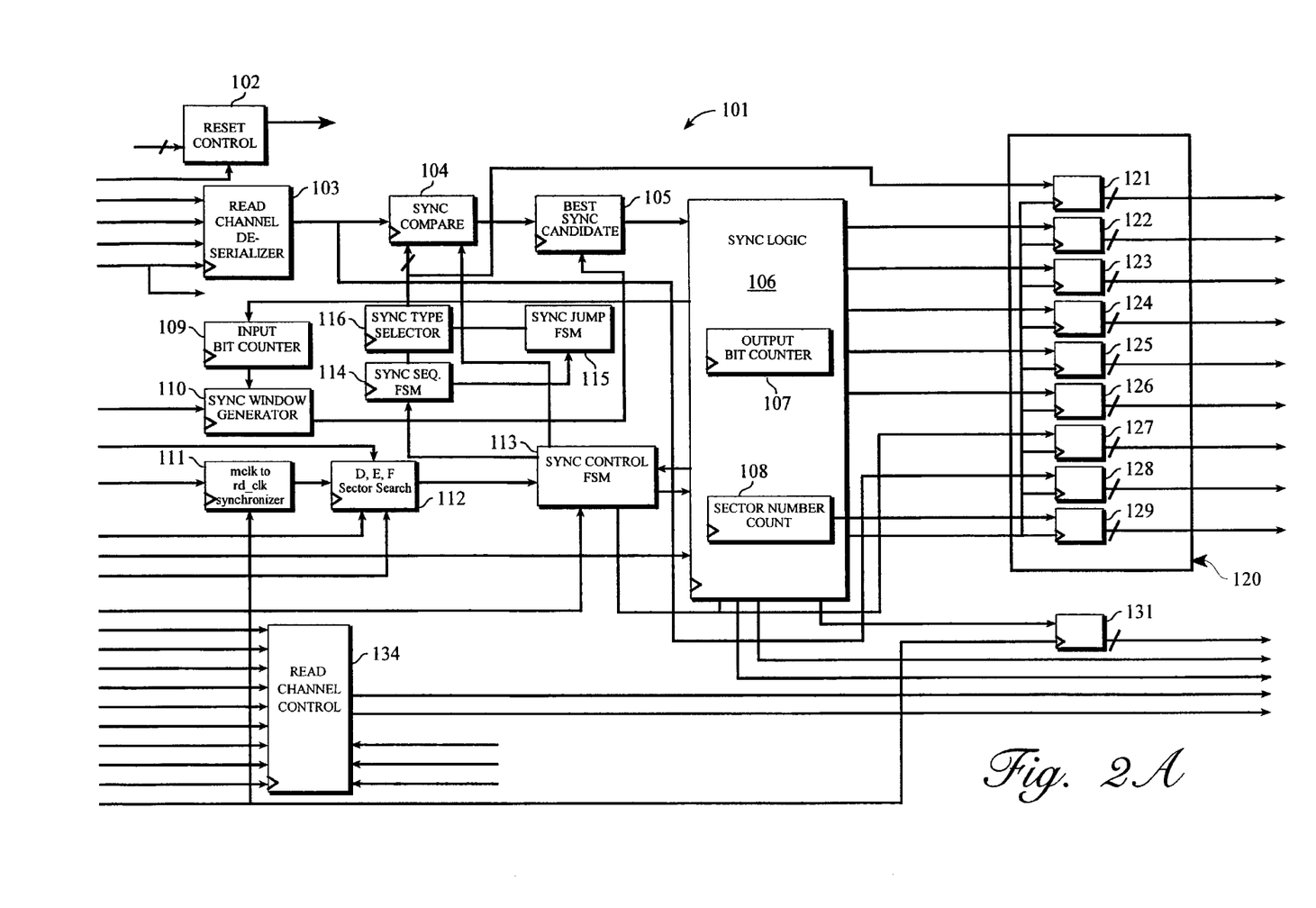
FIGS. 2A–2D provide more detail on the FIG. 1 sync detect block.
Figure 2B:
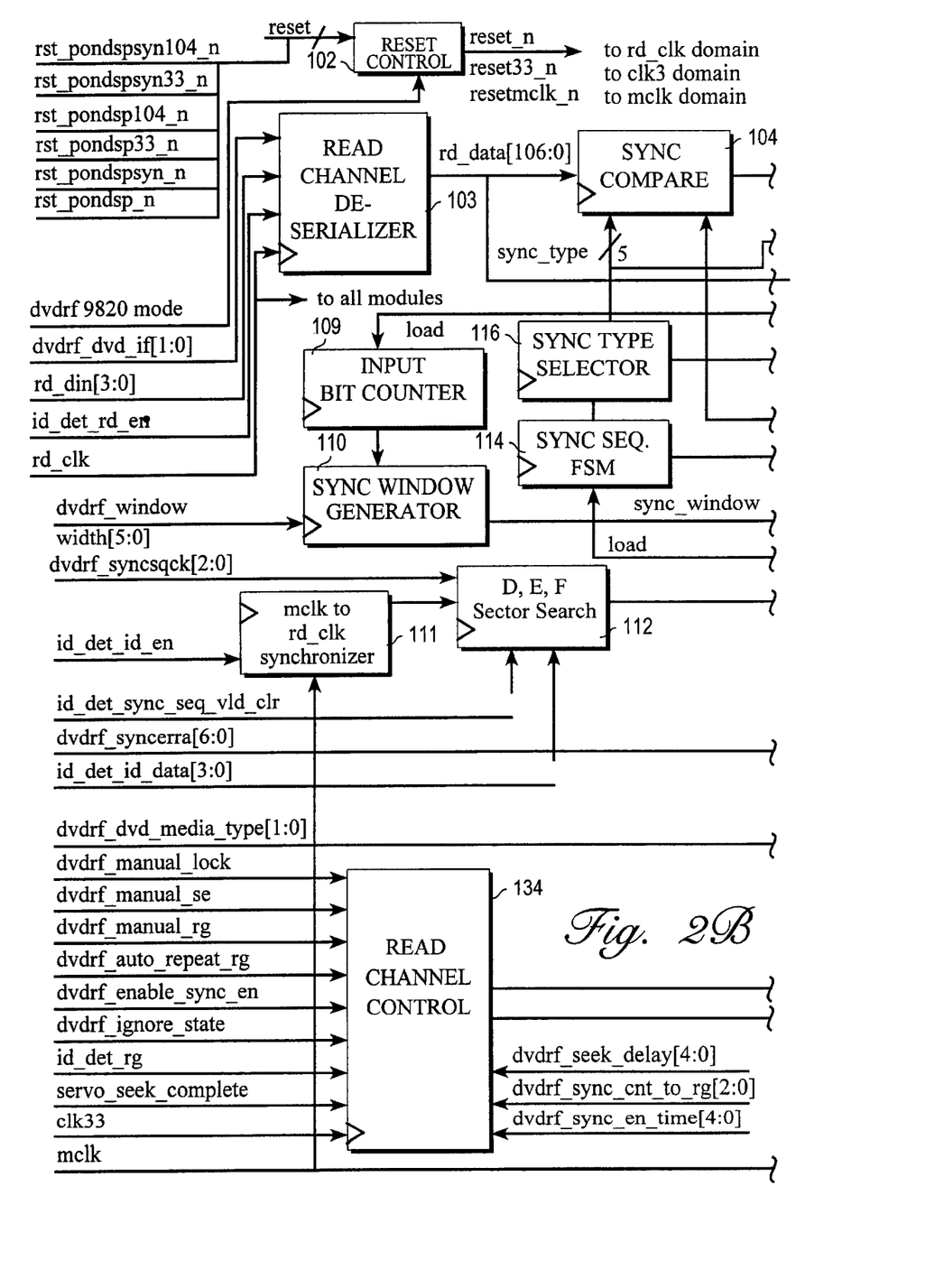
Figure 2C:
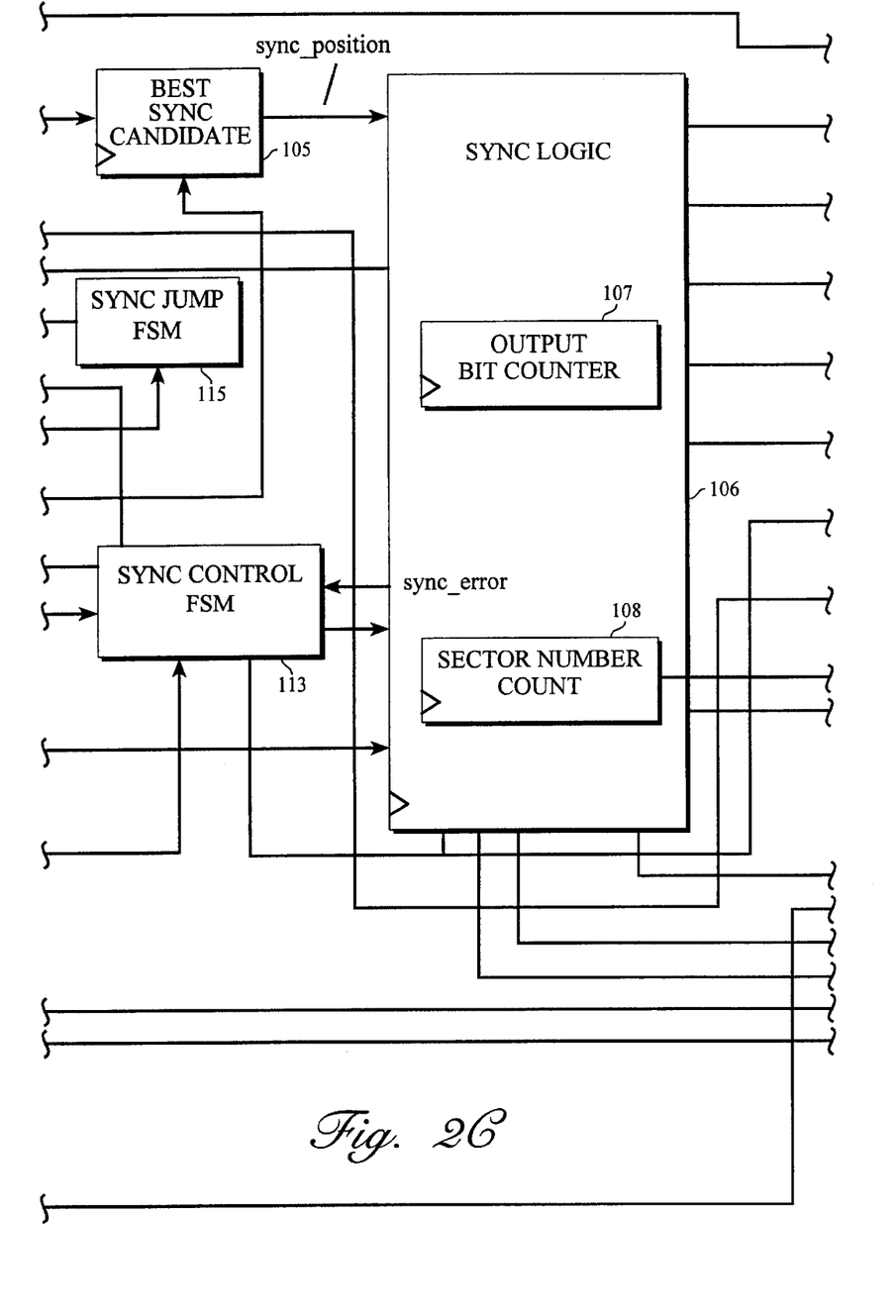
Figure 2D:
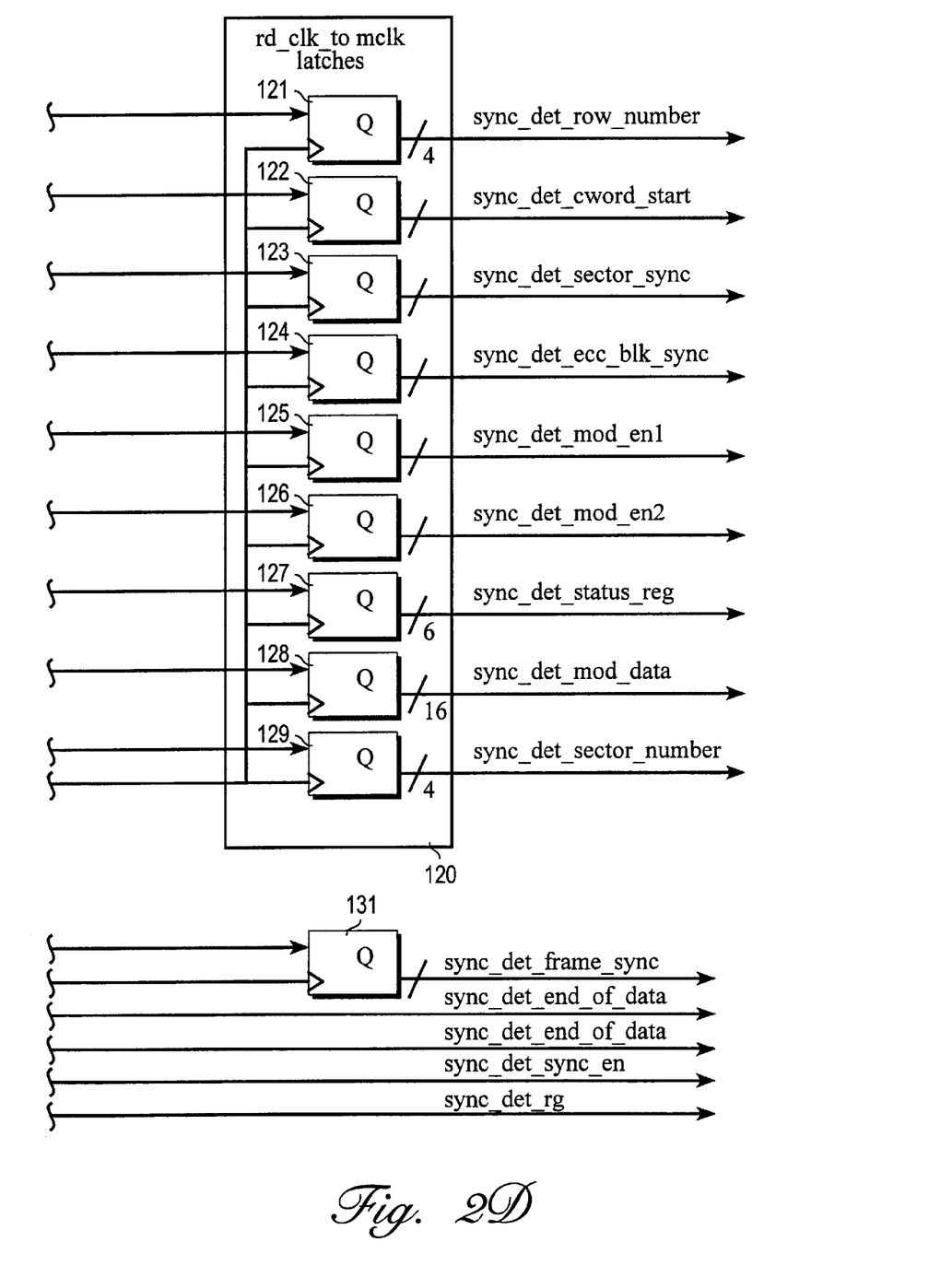

FIG. 1 is a schematic block diagram illustrating a sync detect block 11, with input and output signals. The sync detect block 11 includes a read clock (RD_CLK) domain 12, a master clock (MCLK) domain 13, a servo clock domain 14 and a fixed clock (CLK 33) domain 15. The sync detect block 11 receives reset signals 16, microprocessor control signals 17 and read channel data 18. The read channel data 18 includes clock signals that, according to the present embodiment, range from 26 to 60 MHz. The MCLK domain 13 receives master clock (MCLK) signals 19 and sector ID data 20. The fixed clock domain 15 receives read channel control signals 22. The MCLK domain 13 provides output signals, which include microprocessor status signals 23, sync signals 24, data signals for demodulation 25, location information 26 and ID detect signals 27.

The fixed clock domain 15 provides servo control signals 28 and read channel control signals 29. The MCLK domain 13 is generally fixed for any one implementation. The MCLK domain 13 receives the ID detect signals 26 and provides sync detection data. The fixed clock domain 15 is a fixed rate block that cannot be changed by the user. Anything that is required on the sync detector 11 that is time-based, with timing that is not to be changed, uses the CLK33 circuit 15. By comparison, the MCLK signals 19 used to operate the MCLK domain 13 can vary between 33 and 60 MHz in an initial embodiment; the CLK33 circuit 15 operates at a fixed rate of 33.8688 MHz. similarly, the RD_CLK domain 12 can vary in clock rate, with typical clock rates between 26 and 52 MHz.

Additionally, the variable rate clocks, 12 and 13, are expected to have an increased upper range with increased rates. Factors that may cause the RD_CLK rate to vary include the format of the medium being read, the format of the data on the medium, and the rate at which the medium is being read. For example, a 2x DVD drive would have a correspondingly faster clock speed than would a 1x DVD drive. In addition, a sync monitor must be able to track changes in read speed; a change from 26 MHz to 52 MHz, for example, must be carried out gradually. Additionally, a read channel can change the data acquisition rate. It is possible to vary the channel rate from one bit per clock cycle to multiple bits per clock cycle. This allows one to keep the clock rate on a motherboard at a lower rate than the rate of a high speed interface.

FIGS. 2A–2D are schematic block diagrams showing further details of the sync detect block 11. The sync detect block 101 includes a reset circuit 102, a read channel de-serializer 103, a sync comparison circuit 104, a best sync candidate selection circuit 105, a sync logic circuit 106, an output bit counter 107, a sector number counter 108, an input bit counter 109, a sync window generator 110 and an MCLK_to_read_clock synchronizer 111, which provides an input signal for a D,E,F sector search circuit 112.

The D,E,F sector search circuit 112 provides a signal for a sync control FSM circuit 113, which in turn provides load signals for a sync sequence FSM circuit 114. The FSM circuit 114 in turn provides signals for a sync jump FSM circuit 115. The sync sequence FSM circuit 114 and the sync jump FSM circuit 115 are connected to a sync type selector 116, which provides sync type output signals for the sync compare circuit 104. The sync type output signal is also provided for a read_clock_to_MCLK latch circuit 120, which includes a plurality of latch output signals from latches 121–129. A separate latch 131 is used to provide sync detect frame sync signals, and a read channel control circuit 134 provides sync detection sync enable signals and sync detection regulation signals.

Figure 3A:
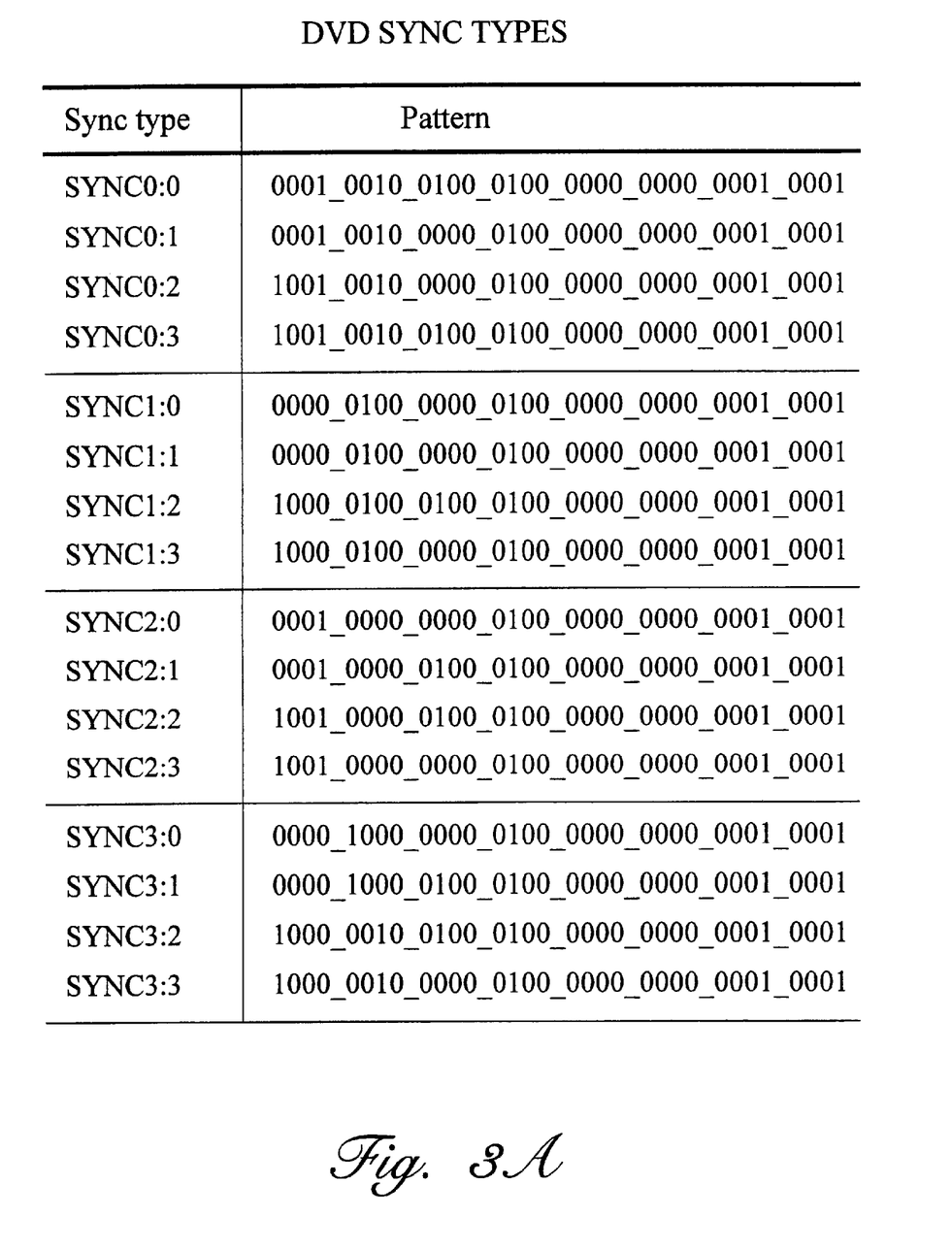
FIGS. 3A, 3B, 3C and 3D are tables showing sync types and sync sequences for DVD and for CD.
Figure 3B:
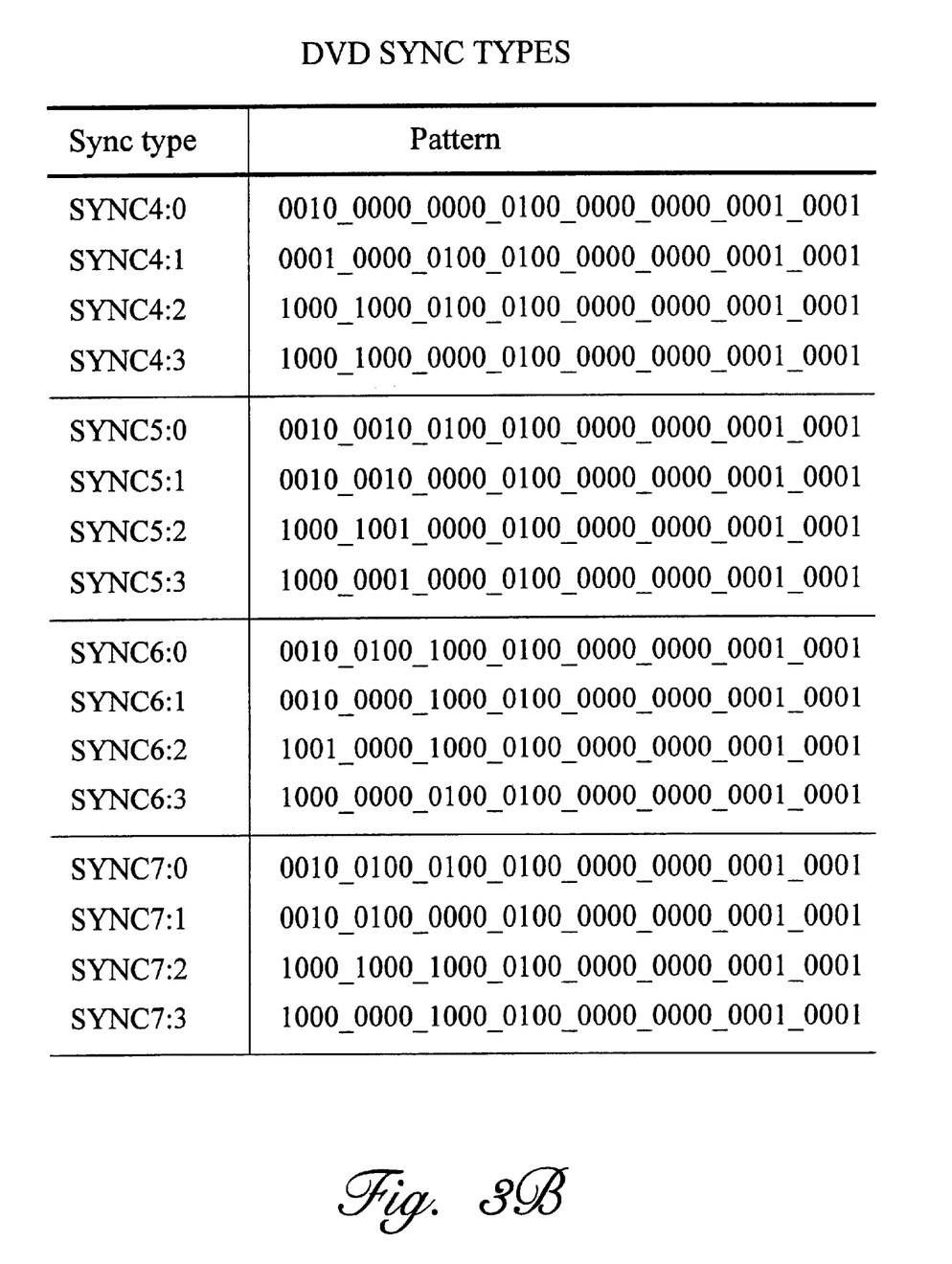
Figure 3C:
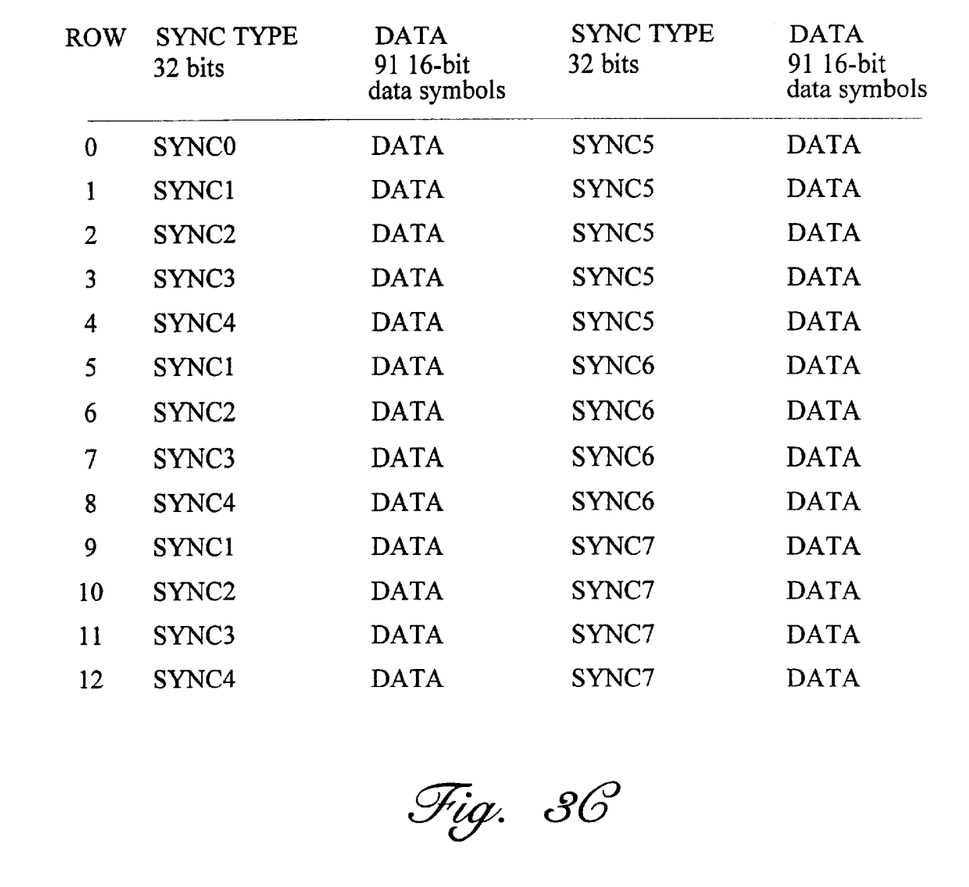
Figure 3D:
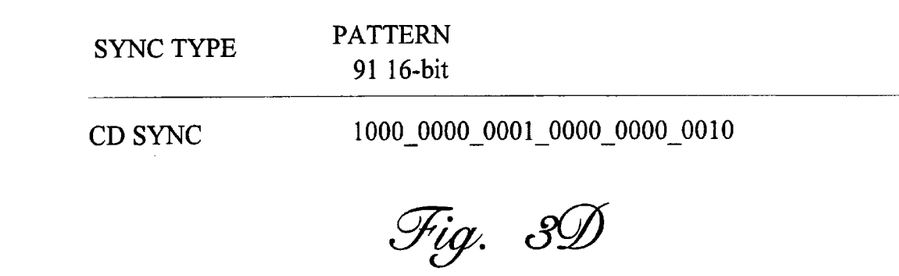

FIGS. 3A and 3B are tables showing sync types and sync patterns for DVD data. Each sync type is identifiable by one or more sync patterns (preferably four for DVD and one for CD), and error control is implemented based on the particular sync pattern. In some instances, the sync pattern includes multiple sequential sync patterns. Within a given block of 26 sync patterns, each sync pattern appears in a predetermined order. For example, one sync pattern sequence is {0, 5, 1, 5, 2, 5, 3, 5, 4, 5, 1, 6, 2, 6, . . . } until the pattern repeats itself, as indicated in the table in FIG. 3C. FIG. 3C shows the order of 26 valid 32-bit sync patterns. Because a sync pattern may not be aligned to an even bit boundary, in a 2-bit or 4-bit input mode, a search of four new input bits occurs at the same time so that 26×4=104 parallel sync searches occur simultaneously. When the location of a first sync pattern is identified, the sync search subsequently focuses on the next expected sync pattern, spaced approximately B bits from the immediately preceding sync pattern (B=1488 for DVD; B=588 for CD). FIG. 3D is a table showing the particular sync pattern used for CD data that consists of 24 bits, instead of the 32 bits used for DVD.

A search for a sync pattern begins at any point in a bit stream. When the first sync pattern is encountered, this pattern is examined to determine the first bit stream sequence actually encountered. The sync comparison circuit 104 determines which of the 26 sync patterns provides the best match. Preferably, but not necessarily, the first sync pattern that provides a best match must provide an exact match; otherwise, the search continues. A lookup table associated with the sync comparison circuit 104 is consulted to determine which possible sync patterns may occur. If, for example, a sync 5 pattern is sensed, the next sync type will correspond to sync 1, 2, 3 or 4, although the system cannot predict with certainty which sync type will occur. The next sync type selector is (arbitrarily) set for sync type 1.

A subsequent sync pattern, or preferably two or three consecutive sync patterns, is received and passed to the sync comparison circuit 104. Where a sync 5 is followed by a sync 1, an ambiguity exists, because each of the sync sequences 5-1-5 and 5-1-6 can occur, in one embodiment. For this reason, the system preferably senses three consecutive sync patterns before determining the particular position of these sync patterns within the sequence of 26 sync patterns. In one embodiment, this sequence of sync patterns is used for DVD data but not for CD data.

Where CD data are received, all sync patterns are the same. Once a sync pattern is found for CD data, a second location in the data is examined to determine where the data sector begins. In one embodiment, the system uses a data format, such as found on a DVD disc, in which the sync data also contains information to be used in determining a location within a data sector. Once the presently sensed sync pattern is determined, the location of the (next) sync 0 allows determination of the start of a frame. From this point on, the system expects that sequential sectors are read in at regular intervals, with sync types that correspond to data types. In a DVD data format, the sync sequence 5-1 occurs twice in each frame, and a third consecutive sync is examined to determine which sync sequence (i.e., 5-1-5 or 5-1-6) is presently sensed. For any other sync sequence (e.g., 5-6 or 3-4), examination of two consecutive sync patterns is sufficient to determine the location within a frame.

Determination of a (most likely) sync location proceeds generally as follows. Where sync pattern matches are examined, the system preloads a selected initial value $\epsilon_{min}$ to be matched and compares the number of bit matches of a first segment of S consecutive bits with the S consecutive bits of the sync pattern. If the number of bit matches of this first segment is at least equal to $\epsilon_{min}$, the first segment and/or its corresponding location is flagged, and the number of bit matches for this first segment, written $\epsilon1(j=1)$, replaces the value $\epsilon_{min}$ for the next comparison value. If the number of bit matches of this first segment is less than $\epsilon_{min}$, the value $\epsilon_{min}$ (not $\epsilon1(j=1)$) is used for the next (second segment) comparison value. The number of bit matches for the second segment is then compared against the comparison value ($\epsilon_{min}$ or $\epsilon1(j=1)$), and a new comparison value is determined.

This procedure continues for each of as many as H consecutive locations and H corresponding segments. If one segment has a higher bit match value than all other segments and this values is at least equal to $\epsilon_{min}$, the location corresponding to this segment is chosen as the sync pattern location. If two or more segments have the same highest bit match value and this value is at least equal to $\epsilon_{min}$, the segment location that is closest to a "central" location (B bits beyond the immediately preceding sync location) is chosen as the next sync location. If no segment has a bit match value that is at least equal to $\epsilon_{min}$, the next sync location is taken to be a selected number of bits (e.g., B bits) beyond the immediately preceding sync location.

Where bit mismatches, rather than bit matches, are the focus, the system preloads a selected initial value $\epsilon_{max}$ to be matched and compares the number of bit matches of each segment of S consecutive bits with the S consecutive bits of the sync pattern. The number of bit mismatches for a surviving segment must be no greater than $\epsilon_{max}$, and preferably smaller.

Figure 4:
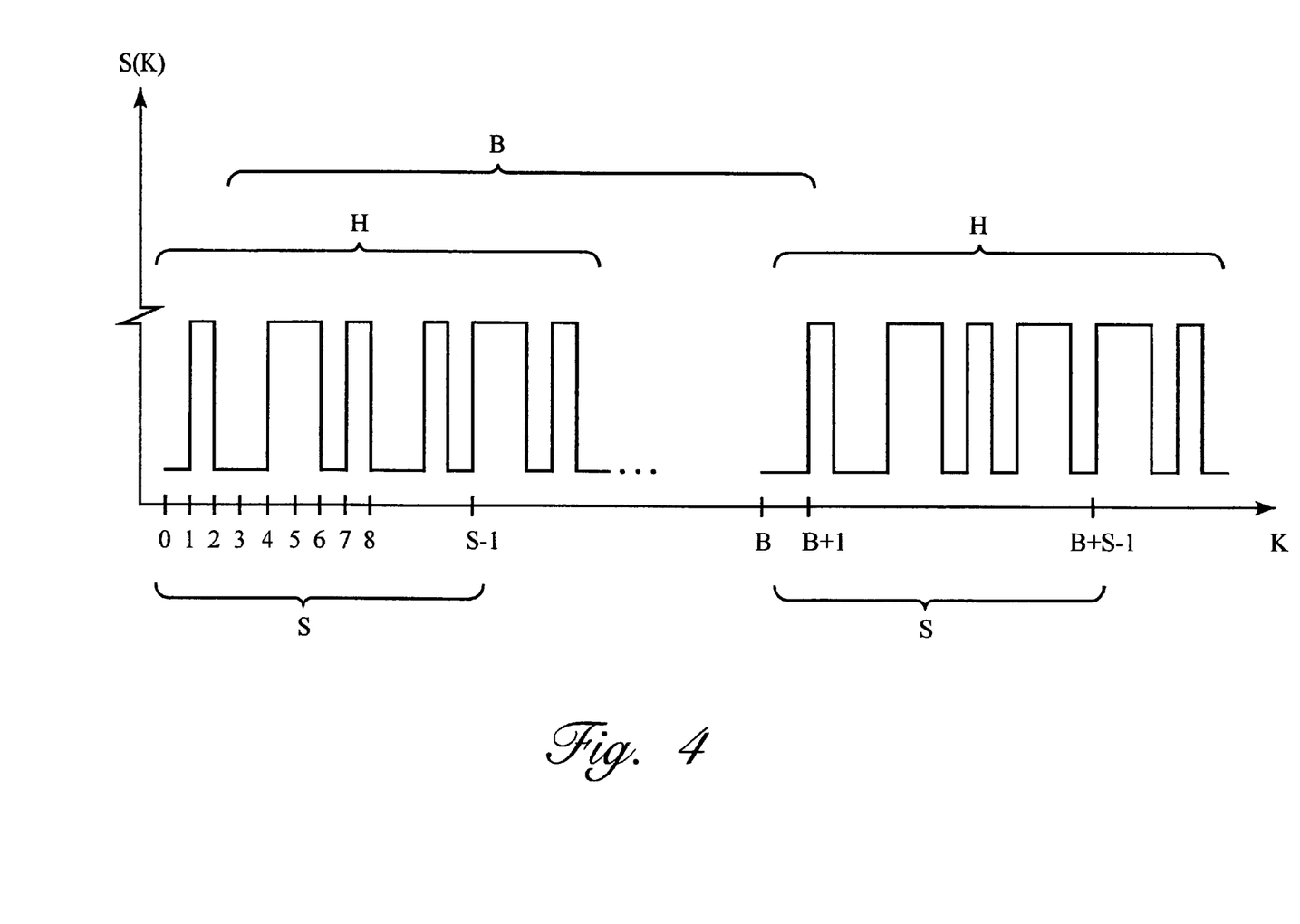
FIG. 4 graphically illustrates a typical bit pattern processed according to the invention.

FIG. 4 illustrates a typical data stream, including original data and sync patterns, that is received at a signal receiver. First and second consecutive sync patterns, each of width S bits, are embedded in the original data stream, with a distance of separation of the sync patterns reference locations being B' bits, where the integer B' may or may not coincide with the integer B. Each sync detect window has a width of H bits, where H is often, but not necessarily, equal to 2N+1, and the window reference location is located at an estimated location (with an optional offset of 0.5 bit) of the corresponding sync pattern.

Assume that the preceding sync pattern P(m−1) has been identified and that the next succeeding sync pattern P(m) is to be found. The system evaluates all possible reference locations for the sync pattern P(m) within the corresponding window W(m) and evaluates the distance B' of the reference location of the sync pattern P(m) from the reference location of the preceding sync pattern P(m−1). At most one reference location of the sync pattern P(m) will be chosen for the subsequent demodulation. As each new data bit d(k) (k=1, 2, . . . ) is received from the read channel, a selected metric is calculated. The selected metric may be the number of bit mismatches with a reference pattern s(k−j) (k−j=1, 2, . . . , S) of width S or may be the number of bit matches with the reference pattern.

If the number of bit matches is used, a suitable metric is $$\varepsilon 1(j) = \sum_{k=1}^{S} p(k) * s(k - j), \qquad (1)$$

where * is a two-place operation, such as EXclusive NOR (XNOR) or AND or simple multiplication, and the index j is chosen so that a reference location of the sync reference pattern coincides with a selected location in the sync detect window, such as the first location (n=1), an interior location (1<n <H), or the last location (n=H) of the sync detect window. Any other two-place operation that counts bit matches between a first finite data stream p(k) and a second finite data stream s(k−j), can be used here. Where interest focuses on the number of bit matches, the number $\epsilon 1(j)$ is compared with a threshold value $\epsilon_{min}$; and the reference location corresponding to Eq. (1) is accepted as a sync pattern first level candidate reference location only if the metric $\epsilon 1(j)$ satisfies the constraint $$\epsilon 1(j) \geq \epsilon_{min}. \qquad (2)$$

where $\epsilon_{min}$ (>0) is a selected minimum value. A collection of one or more first level candidate reference locations (j=j1, j2, . . . ) that satisfy Eqs. (1) and (2) is analyzed in a second level test to determine one or more second level candidate reference locations, j=J, for which $$\epsilon 1(J) = \max\{\epsilon 1(j1), \epsilon 1(j2), \ldots\}. \qquad (3)$$

If the number of bit non-matches or mismatches is used, a suitable metric is $$\varepsilon 2(j) = \sum_{k=1}^{S} p(k) * s(k - j), \qquad (4)$$

where * is a two-place operation, such as EXclusive OR (XOR) or NAND, and the index j is chosen so that a reference location of the sync (reference) pattern coincides with a selected location in the sync detect window. Any other two-place operation that counts bit mismatches between a first finite data stream d(k) and a second finite data stream s(k−j) can be used here. Where interest focuses on the number of bit mismatches, the number $\epsilon 2(j)$ is compared with a threshold value $\epsilon_{max}$; and the reference location corresponding to Eq. (3) is accepted as a sync pattern first level candidate reference location only if the metric $\epsilon 2(j)$ satisfies the constraint $$\epsilon 2(j) \leq \epsilon_{max}. \qquad (5)$$

where $\epsilon_{max}$ (>0) is a selected maximum value. A collection of one or more first level candidate reference locations, j=j1, j2, . . . ) that satisfy Eqs. (4) and (5) is analyzed in a second level test to determine one or more second level candidate reference locations, j=J, for which $$\epsilon 2(J) = \min\{\epsilon 2(j1), \epsilon 2(j2), \ldots\}. \qquad (6)$$

Each second level candidate reference location (J=J1, J2, . . . ) that satisfies Eqs. (1), (2) and (3) (for bit matches), or that satisfies Eqs. (4), (5) and (6) (for bit mismatches), is then subjected to a third level test: Which, if any, of the second level candidate reference locations is "closest" to the reference location, J=J0, of the present sync detect window? If one second level candidate reference location, say, J=JC, is closer to the sync detect window reference location, the candidate corresponding to J=JC is chosen as the reference location of the sync pattern P(m). This test may be implemented using a constraint such as $$|JC-J0| = \min\{|J1-J0|, |J2-J0|, \ldots\}, \qquad (7)$$

where J=J1, J=J2, etc. (including J=JC) are the locations of all the second level candidate reference locations.

If only one second level candidate reference location, J=JC, satisfies Eq. (7), that particular reference location is used to determine the location of the sync pattern P(m). If more than one second level candidate reference locations, J=JC, satisfy Eq. (7), a fourth test or analysis is optionally used to choose from among these candidates, J=JC.

A sync detect window of width H bits is used to designate the start and end of the sync detect search at the first level. That is, H different, consecutive candidate reference locations are analyzed, using the metric $\epsilon 1(j)$ or the metric $\epsilon 2(j)$; for example, corresponding to j=1, 2, . . . , H. One hardware-based implementation of this approach allows the firmware or software to choose the parameter H in the range $0 \leq H \leq 65$. However, the invention allows the parameter H to be set equal to any reasonable positive integer.

All incoming data from the read channel are stored into a FIFO module 21 in FIG. 2, where the FIFO module has a minimum length of H+S bits. In a DVD implementation, for example, the sync pattern may be S=32 bits wide and the minimum FIFO module length is 65+32=97 bits. If the sync detect system is configured as one or more pipelines, the system speed can be enhanced. For each extra clock stage that is added to the sync detect pattern or to the sync detect window width, the FIFO module length must be expanded accordingly.

A bit counter is used to track the bit distance from the last (immediately preceding) sync pattern found. The bit counter increments an index b=1, 2, ..., B, B+1, ..., where B is the selected ideal reference-to-reference distance for sync patterns. When the bit counter reaches the value b=B−H/2, a new search for the next sync pattern P(m) begins.

As each clock pulse is received, S consecutive data bits in the FIFO module are compared with S consecutive bits of a sync pattern or other reference pattern. The total number of bit matches $\epsilon1(j)$ (or, alternatively, of bit mismatches $\epsilon2(j)$) is calculated, optionally using the metric in Eq. (1) (or in Eq. (4)) for such calculations. The non-negative bit distance, from each candidate reference location to the window reference location, is also calculated. For example, the metric $\epsilon1(j)$ with a threshold value $\epsilon_{min}$=S−3, S−2, S−1 or S can be used as a first level test. Alternatively, the metric $\epsilon2(j)$ with a threshold value $\epsilon_{min}$=0, 1, 2 or 3 can be used as a first level test.

As each metric value $\epsilon1(j)$ (j=1, 2, ..., S) is calculated, this value is compared with a previously loaded metric value (initially $\epsilon_{min}$ or another value), and the reference location (j=J) corresponding to the greater of these two metric values is chosen as a first level candidate. When all S metric values $\epsilon1(j)$ have been calculated and compared, at least one metric value, j=J ($\epsilon \leq J \leq S$), satisfies the constraint $$\epsilon1(J)=\max\{\epsilon1(j=1), \epsilon1(j=2), \ldots, \epsilon1(j=S)\}. \quad (8)$$

This comparison process continues until all S metric values $\epsilon1(j)$ have been computed. This formalism is equivalent to performing a bubble sort of a sequence of numbers to provide an ordered sequence (smallest to largest, or largest to smallest).

Each metric value $\epsilon1(J)$ satisfying Eq. (8) is compared with the threshold value $\epsilon_{min}$ in Eq. (2), which is provided by pre-loading or otherwise. Preferably, the first test, in Eq. (8), and the second test, in Eq. (2), are performed simultaneously. All surviving metric values $\epsilon1(J)$ have the same value and satisfy Eq. (2) and Eq. (8). The corresponding second level candidate reference locations are now subjected to the third level test or analysis set forth in Eq. (7). If more than one third level candidate reference location exists, all with the same metric value $\epsilon1(J)$, the fourth test or analysis is optionally used to choose one of these third level candidate reference locations for the next sync pattern P(m).

Alternatively, a metric such as $\epsilon2(j)$ can be used. As each metric value $\epsilon2(j)$ (j=1, 2, ..., S) is calculated, this value is compared with the previous lowest metric value, and the reference location (j=J) corresponding to the lower of these two metric values is chosen as a first level candidate. When all S metric values $\epsilon2(j)$ have been calculated and compared, at least one metric value, j=J (1≦J≦S), satisfies the constraint $$\epsilon2(J)=\min\{\epsilon2(j=1), \epsilon2(j=2), \ldots, \epsilon2(j=S)\}. \quad (9)$$

This comparison process continues until all S metric values F20) have been computed.

Each metric value $\epsilon2(J)$ satisfying Eq. (9) is compared with the threshold value $\epsilon_{max}$ in Eq. (5), which is provided by pre-loading or otherwise. Preferably, the first test, in Eq. (9), and the second test, in Eq. (5), are performed simultaneously. All surviving metric values $\epsilon2(J)$ have the same value and satisfy Eq. (5) and Eq. (9). The corresponding second level candidate reference locations are now subjected to the third level test or analysis set forth in Eq. (7). If more than one third level candidate reference location exists, all with the same metric value $\epsilon2(J)$, the fourth test or analysis is optionally used to choose one of these third level candidate reference locations for the next sync pattern P(m).

When no candidate reference location can be found that satisfies all of the first, second and third level tests or analyses, the system optionally designates the candidate reference location corresponding to the ideal separation distance B (=1488 and 588 for DVD and CD data, respectively, in one implementation) as the reference location for the next sync pattern P(m).

Figure 5:
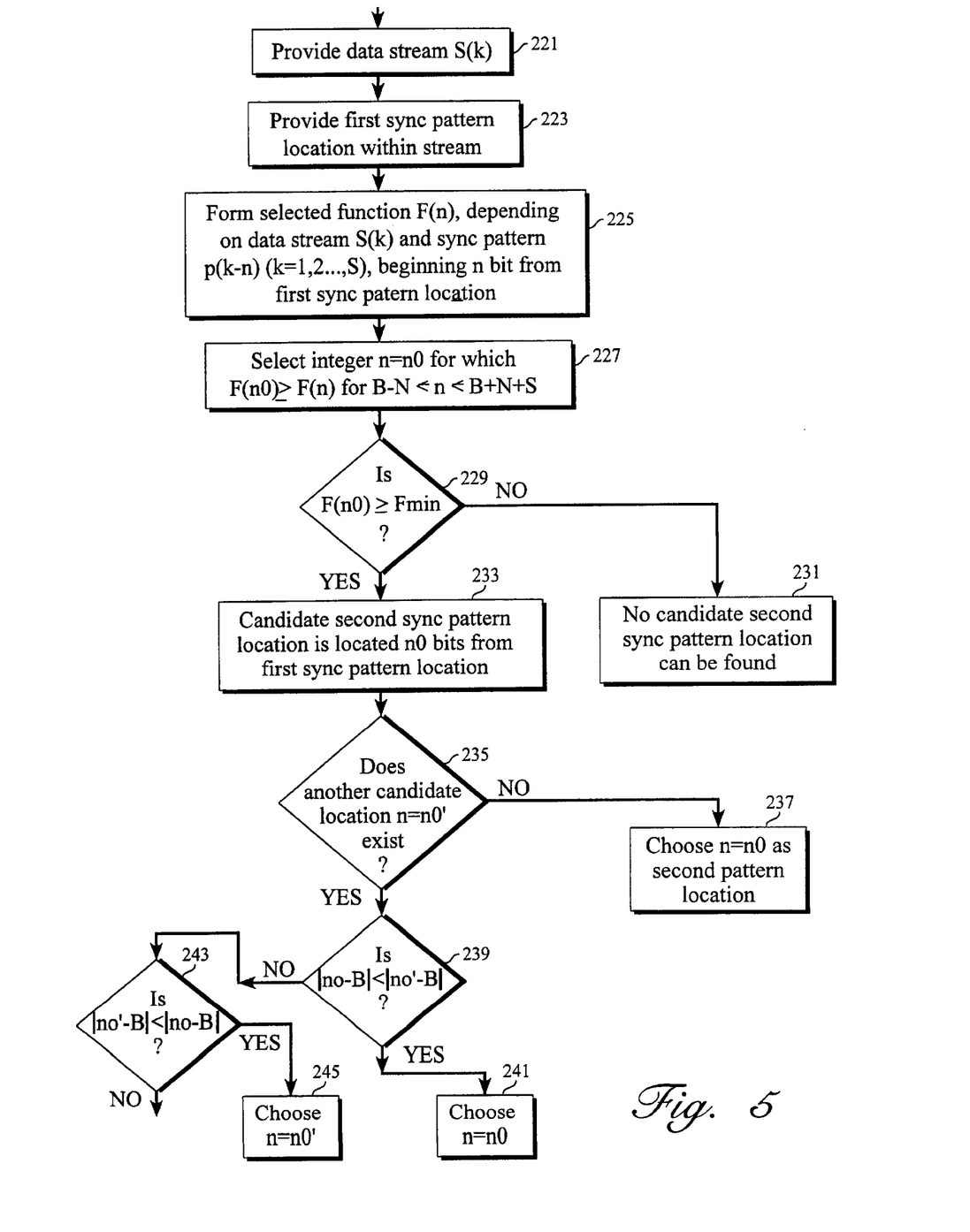
FIG. 5 is a flow chart of a procedure to practice the invention.

FIG. 5 is a flow chart illustrating implementation of the invention according to one embodiment. In a first process 221, the system is provided with a digital data stream s(k) (k=1, 2, ...), which is believed to include a selected sync pattern p(k) having a pattern width of S bits. In a process 223, the system provides a starting location for a first sync pattern within the stream and provides a sync detect window having a selected window width of H bits. In a process 225, the system forms a selected function F(n), which depends upon S bits of the data stream s(k) and upon S bits of the sync pattern p(k−n), beginning at a distance of n bits from the reference location of the first sync pattern, where the integer index n lies in a selected range, such as B−H/2≦n≦B+S+H/2, and B is a selected positive integer. In a process 227, the system selects an integer n=n0 in the selected range for which the function value F(n=n0) is at least as large as the function value F(n) for any integer n in the selected range.

In a process 229, the system determines if the function value F(n=n0) satisfies a constraint F(n=n0)≦$F_{min}$, where $F_{min}$ is a selected threshold value. If this constraint is not satisfied, the system interprets this condition as indicating that a candidate second sync pattern location cannot be found using this approach, in a process 231, and another approach is optionally used to find a second sync pattern location.

If this constraint is satisfied, the system interprets this condition as indicating that at least one candidate second sync pattern can be found in the digital stream, at a distance of n0 bits from the location of the first sync pattern, in a process 233. In a process 235, the system determines if at least one additional integer, n=n0', exists that satisfies the requirements for a candidate second sync pattern location. If the answer to the query in the process 235 is "no," the system chooses n=n0 as corresponding to the only qualifying location for the second sync pattern, in a process 237.

If the answer to the query in the process 235 is "yes," the system moves to a process 239 and determines if the candidates n0 and n0' satisfy the condition |n0−B|<|n0'−B|. If the answer to the query in step 239 is "yes," the system chooses n=n0 as corresponding to the preferred location of the second sync pattern, in a process 241. If the answer to the query in the process 239 is "no," the system moves to a process 243 and determines if the candidates n0 and n0' satisfy the condition |n0'−B|<|n0−B|. If the answer to the query in the process 243 is "yes," the system chooses n=n0' as corresponding to the preferred location of the second sync pattern, in a process 245. If the answer to the query in the process 243 is "no," neither of the candidate location, n=n0 and n=n0', is preferred over the other, and another criterion is preferably used to choose a preferred candidate for the second sync pattern location.

The procedure shown in FIG. 2 is applicable where interest focuses on the number of matches between a data stream segment s(k−n) and a sync pattern p(k), each of length S. In a second embodiment, interest focuses on the number of non-matches between a data stream segment s(k−n) and a sync pattern p(k), each of length S. In this second embodiment: the processes 227 and 229 are replaced by a process 227' (system selects an integer n=n0 in the selected range for which the function value F(n=n0) is no larger than the function value F(n) for any other integer n in the selected range) and a process 229' (system determines if the function value F(n=n0) satisfies a constraint F(n=n0) $\geq F_{min}$, where $F_{min}$ is a selected threshold value), respectively, and all other processes in this second procedure are substantially the same as the processes in FIG. 5.

What is claimed is:

1. A method for determining a location for a sync pattern in a digital signal stream, the method comprising:

providing a digital signal bit stream that is believed to include a selected sync pattern p(k) (k=1, 2, . . . , S) with a width of S bits, where S is a selected positive integer with S$\geq$2;

providing a sync window with a width H bits, where H is a selected positive integer;

providing a first sync pattern reference location in the digital stream;

forming a selected function value F(n) depending upon at least two of S consecutive bits of the sync pattern p(k) and at least two of S consecutive bits of the digital stream s(k−n), beginning at a distance of n bits from the reference location of the first sync pattern, where n is an integer lying in a selected range B−H/2$\leq$n$\leq$B+S+H/2, where B is a selected positive integer;

selecting an integer n=n0 in the selected range for which the function value F(n=n0) is at least as large as the function value F(n) for any other integer in the selected range as a central integer; and when the function value F(n=n0) satisfies F(n=n0) $\geq F_{min}$, where $F_{min}$ is a selected threshold value, interpreting this condition as indicating that a second sync pattern in the digital stream is located n0 bits from the reference location of the first sync pattern.

2. The method of claim 1, further comprising:

when a second integer n=n0' exists in said selected range that satisfies F(n=n0')=F(n=n0) with n0'$\neq$n0, selecting as said central integer said integer n0 if |n0−B|<|n0'−B|, and selecting as said central integer the integer n0' if |n0−B|>|n0'−B|.

3. The method of claim 1, further comprising choosing said selection function value to be the sum $$F(n) = \sum_{k=1}^{S} s(k-n) * p(k),$$

where * is an operator drawn from the group of operators consisting of XNOR, AND and multiplication.

4. The method of claim 1, further comprising choosing said function F(n) to be the number of matches of said value s(k−n) and said value p(k) in a selected range of an integer index k, given by 1$\leq$k$\leq$S.

5. The method of claim 1, further comprising choosing said reference location for said first sync pattern to coincide with a location drawn from the following group of locations: a first location of said sync window, an interior location of said sync window and a last location of said sync window.

6. The method of claim 1, further comprising drawing said integer B from a set consisting of the numbers 588 and 1488.

7. The method of claim 1, further comprising choosing said integer H to be of the form 2·N+1, where N is a selected positive integer.

8. A method for determining a location for a sync pattern in a digital signal stream, the method comprising:

providing a digital signal bit stream that is believed to include a selected sync pattern p(k) (k=1, 2, . . . , S) with a width of S bits, where S is a selected positive integer with S$\geq$2;

providing a sync window with a width H bits, where H is a selected positive integer;

providing a first sync pattern reference location in the digital stream;

forming a selected function value F(n) depending upon at least two of S consecutive bits of the sync pattern p(k) and at least two of S consecutive bits of the digital stream s(k−n), beginning at a distance of n bits from the reference location of the first sync pattern, where n is an integer lying in a selected range B−H/2$\leq$n$\leq$B+S+H/2, where B is a selected positive integer;

selecting an integer n=n0 in the selected range for which the function value F(n=n0) is no larger than the function value F(n) for any other integer in the selected range as a central integer; and when the function value F(n=n0), satisfies F(n=n0)$\leq F_{max}$, where $F_{max}$ is a selected threshold value, interpreting this condition as indicating that a second sync pattern in the digital stream is located n0 bits from the reference location of the first sync pattern.

9. The method of claim 8, further comprising:

when a second integer n=n0' exists in said selected range that satisfies F(n=n0')=F(n=n0) with n0'$\neq$n0, selecting as said central integer said integer n0 if |n0−B|<|n0'−B|, and selecting as said central integer the integer n0' if |no−B|>|n0'−B|.

10. The method of claim 8, further comprising choosing said selection function value to be the sum $$F(n) = \sum_{k=1}^{S} s(k-n) * p(k),$$

where * is an operator drawn from the group of operators consisting of XOR and NAND.

11. The method of claim 8, further comprising choosing said function F(n) to be the number of non-matches of said value s(k−n) and said value p(k) in a selected range of an integer index k, given by 1$\leq$k$\leq$S.

12. The method of claim 8, further comprising choosing said reference location for said first sync pattern to coincide with a location drawn from the following group of locations: a first location of said sync window, a center location of said sync window and a last location of said sync window.

13. The method of claim 8, further comprising drawing said integer B from a set consisting of the numbers 588 and 1488.

14. The method of claim 8, further comprising choosing said integer H to be of the form 2·N+1, where N is a selected positive integer.

15. A system for determining a location for a sync pattern in a digital signal stream, the system comprising:

a source of a digital signal bit stream that is believed to include a sync pattern p(k) with a width of S bits and with a selected bit pattern, where S is a selected positive integer;

a computer that is programmed:

to provide a sync window with a width H, where H is a selected positive integer;

to provide a first sync pattern reference location in the digital stream;

to form a selected function value F(n) depending on S consecutive bits of the sync pattern p(k) (k=1, 2, . .

. , S) and S consecutive bits of the digital stream s(k−n), beginning at a distance of n bits from the reference location of the first sync pattern, where n is an integer lying in a selected range B−N≤n≤B+N+S;

to select an integer n=n0 in the selected range for which the function value F(n=n0) is at least as large as the function value F(n) for any other integer in the selected range as a central integer; and when the function value F(n=n0) satisfies F(n=n0) ≧$F_{min}$, where $F_{min}$ is a selected threshold value, to interpret this condition as indicating that a second sync pattern in the digital stream is located n0 bits from the reference location of the first sync pattern.

16. The system of claim 15, wherein said computer is further programmed so that, when a second integer n=n0' exists in said selected range that satisfies F(n=n0')=F(n=n0) with n0'×n0, said computer selects as said central integer said integer n0 if |n0−B|<|n0'−B|, and selecting as said central integer the integer n0' if |n0−B|>|n0'−B|.

17. The system of claim 15, wherein said computer is further programmed to choose said selection function value to be the sum $$F(n) = \sum_{k=1}^{S} s(k-n) * p(k),$$

where * is an operator drawn from the group of operators consisting of XNOR, AND and multiplication.

18. The system of claim 15, wherein said computer is further programmed to choose said function F(n) to be the number of matches of said value s(k−n) and said value p(k) in a selected range of an integer index k, given by 1≤k≤S.

19. The system of claim 15, wherein said reference location for said first sync pattern coincides with a location drawn from the following group of locations: a first location of said sync window, a center location of said sync window and a last location of said sync window.

20. The system of claim 15, wherein said integer B is drawn from a set consisting of the numbers 588 and 1488.

21. The system of claim 15, wherein said integer H is chosen to be of the form 2·N+1, where N is a selected positive integer.

22. A system for determining a location for a sync pattern in a digital signal stream, the system comprising:

a source of a digital signal bit stream that is believed to include a sync pattern s(k) (k=1, 2, . . . , S) with a width of S bits, where S is a selected positive integer;

a computer that is programmed:

to provide a sync window with a width H, where H is a selected positive integer;

to provide a first sync pattern reference location in the digital stream;

to form a selected function value F(n) of S consecutive bits of the sync pattern p(k) and S consecutive bits of the digital stream s(k−n), beginning at a distance of n bits from the reference location of the first sync pattern, where n is an integer lying in a selected range B−N≤n≤B+N+S;

to select an integer n=n0 in the selected range for which the function value F(n=n0) is no larger than the function value F(n) for any other integer in the selected range as a central integer; and when the function value F(n=n0) satisfies F(n=n0) <$F_{max}$, where $F_{max}$ is a selected threshold value, to interpret this condition as indicating that a second sync pattern in the digital stream is located n0 bits from the reference location of the first sync pattern.

23. The system of claim 22, wherein said computer is further programmed so that, when a second integer n=n0' exists in said selected range that satisfies F(n=n0')=F(n=n0) with n0'≠n0, said computer selects as said central integer said integer n0 if |n0−B|<|n0'B|, and selecting as said central integer the integer n0' if |n0−B|>|n0'B|.

24. The system of claim 22, wherein said computer is further programmed to choose said selection function value to be the sum $$F(n) = \sum_{k=1}^{S} s(k-n) * p(k),$$

where * is a Boolean operator drawn from the group consisting of XOR and NAND.

25. The system of claim 22, wherein said computer is further programmed to choose said function F(n) to be the number of non-matches of said value s(k−n) and said value p(k) in a selected range of an integer index k, given by 1≤k≤S.

26. The system of claim 22, wherein said reference location for said first sync pattern coincides with a location drawn from the following group of locations: a first location of said sync window, a center location of said sync window and a last location of said sync window.

27. The system of claim 22, wherein said integer B is drawn from a set consisting of the numbers 588 and 1488.

28. The system of claim 22, wherein said integer H is chosen to be of the form 2·N+1, where N is a selected positive integer.

29. A computer program product for determining a location for a sync pattern in a digital signal stream, the product comprising:

a first computer code mechanism for providing a digital signal bit stream that is believed to include a selected sync pattern p(k) (k=1, 2, . . . , S) with a width of S bits, where S is a selected positive integer with S≧2;

a second computer code mechanism for providing a sync window with a width H bits, where H is a selected positive integer;

a third computer code mechanism for providing a first sync pattern reference location in the digital stream;

a fourth computer code mechanism for forming a selected function value F(n) depending upon at least two of S consecutive bits of the sync pattern p(k) and at least two of S consecutive bits of the digital stream s(k−n), beginning at a distance of n bits from the reference location of the first sync pattern, where n is an integer lying in a selected range B−H/2≤n≤B+S+H/2, where B is a selected positive integer;

a fifth computer code mechanism for selecting an integer n=n0 in the selected range for which the function value F(n=n0) is at least as large as the function value F(n) for any other integer in the selected range as a central integer; and when the function value F(n=n0) satisfies F(n=n0)>$F_{min}$, where $F_{min}$ is a selected threshold value, a sixth computer code mechanism for interpreting this condition as indicating that a second sync pattern in the digital stream is located n0 bits from the reference location of the first sync pattern.

30. The product of claim 29, further comprising:

when a second integer n=n0' exists in said selected range that satisfies F(n=n0')=F(n=n0) with n0'×n0, a seventh computer code mechanism for selecting as said central integer said integer n0 if |n0−B|<|n0'−B|, and selecting as said central integer the integer n0' if |n0−B|>|n0'−B|.

31. A computer program product for determining a location for a sync pattern in a digital signal stream, the product comprising:

a first computer code mechanism for providing a digital signal bit stream that is believed to include a selected sync pattern p(k) (k=1, 2, ..., S) with a width of S bits, where S is a selected positive integer with $S \geq 2$;

a second computer code mechanism for providing a sync window with a width H bits, where H is a selected positive integer;

a third computer code mechanism for providing a first sync pattern reference location in the digital stream;

a fourth computer code mechanism for forming a selected function value F(n) depending upon at least two of S consecutive bits of the sync pattern p(k) and at least two of S consecutive bits of the digital stream s(k−n), beginning at a distance of n bits from the reference location of the first sync pattern, where n is an integer lying in a selected range $B-H/2 \leq n \leq B+S+H/2$, where B is a selected positive integer;

a fifth computer code mechanism for selecting an integer n=n0 in the selected range for which the function value F(n=n0) is at least as large as the function value F(n) for any other integer in the selected range as a central integer; and when the function value F(n=n0) satisfies F(n=n0) <$F_{max}$, where $F_{max}$ is a selected threshold value, a sixth computer code mechanism for interpreting this condition as indicating that a second sync pattern in the digital stream is located n0 bits from the reference location of the first sync pattern.

32. The product of claim 31, further comprising:

when a second integer n=n0' exists in said selected range that satisfies F(n=n0')=F(n=no) with m0'≠n0, a seventh computer code mechanism for selecting as said central integer said integer n0 if |n0−B|<|n0'B|, and selecting as said central integer the integer n0' if |n0−B|>|n0'B|.

* * * * *

UNITED STATES PATENT AND TRADEMARK OFFICE
CERTIFICATE OF CORRECTION

PATENT NO. : 6,826,245 B1
DATED : November 30, 2004
INVENTOR(S) : Christopher T. Brown and Phares Grey It is certified that error appears in the above-identified patent and that said Letters Patent is hereby corrected as shown below:

Column 3,
Line 22, after "MHz." and before "the", delete "similarly, and insert -- Similarly --.

Column 7,
Line 33, after "value, j=J" and before "satisfies the constraint", delete "$(\varepsilon \leq J \leq S)$," and insert -- $(1 \leq J \leq S)$, --.
Line 62, before "have been computed.", delete "F20" and insert -- $\varepsilon 2(j)$ --.

Column 11,
Line 18, after "with" and before "said computer", delete "n0'×n0," and insert
-- $n0' \neq n0$ --.

Column 12,
Line 53, after "when the function value F(n=n0) satisfies", delete "F(n=n0) > $F_{min}$," and insert -- F(n=n0) $\geq F_{min}$, --.
Line 61, before "seventh", delete "n0'×n0," and insert -- $n0' \neq n0$ --.

Signed and Sealed this

Second Day of August, 2005

JON W. DUDAS
*Director of the United States Patent and Trademark Office*